Patented June 3, 1952

2,598,980

UNITED STATES PATENT OFFICE 2,598,980

MAGNESIA CEMENT PRODUCTS AND THEIR MANUFACTURE

Paul S. Denning, Joliet, Ill., assignor to F. E. Schundler and Company, Incorporated, Joliet, Ill., a corporation of Illinois No Drawing. Application February 26, 1949, Serial No. 78,679

6 Claims. (Cl. 106—86)

This invention relates to improvements in products of magnesia cements and their manufacture, and among other objects aims to provide an improved product of this character to eliminate difficulties arising from the use of magnesium chloride, magnesium sulphate and other reacting solutions in such products.

Other objects and advantages of the invention will appear from the following description of one illustrative product and its manufacture.

Magnesium oxychloride and other magnesia cements of this character are made by mixing plastic, calcined or caustic magnesia (magnesium oxide), a filler or aggregate, and magnesium chloride or other analogous solution. For convenience, the invention will be described in connection with magnesium oxychloride cement, but as presently explained, it is applicable to various magnesia cements such as magnesium oxysulphate cement, wherein the magnesia reacts in solution with the soluble constituent of the cement. After adequate mixing, the cementitious mixture is molded or otherwise formed into the desired product. The reaction product of magnesia and magnesium chloride solution is thought to be a so-called solid solution including oxychloride crystals having the chemical formula $3MgO.MgCl_2.10H_2O$. The magnesium oxide first dissolves wholly or progressively in the magnesium chloride solution; and the rate or degree of solubility depends on the concentration of the magnesium chloride solution. Concentrations less than 18° Bé. (Beaumé) are unsatisfactory, 22° Bé. being the minimum concentration commonly used. Heretofore it has not been practical to employ substantially higher concentrations, because the low water content made the cement difficult to work. Cements of this character have been used for many years in various building materials; they have high strength and other desirable properties. The aggregate used depended somewhat on the properties desired in the final product. These aggregates comprised fine and/or coarse mineral materials such as stone, marble, asbestos and various vegetable aggregates such as wood flour, sawdust, fiber and mixtures of various aggregates. An aggregate is necessary since neat magnesium oxychloride cement develops high internal stresses and is likely to fracture or explode on that account. Of course, the use of an aggregate also reduces cost since the aggregate functions as an "extender" or filler for the cement. However, aggregates present a problem due to their absorption and retention of substantial amounts of magnesium chloride solution. This absorption occurs even though the magnesium chloride is first mixed with the magnesium oxide and the resulting cementitious slurry then mixed with the aggregate. The latter nevertheless abstracts a substantial amount of the liquid phase (magnesium chloride solution) from the slurry. The magnesium chloride solution thus absorbed and retained is not available for reaction with the magnesium oxide, and therefore additional magnesium chloride (to replace that absorbed) must be used to provide adequate magnesium chloride for reaction. It is thus not possible to limit the magnesium chloride to the optimum amount necessary for a proper reaction with the magnesia. Moreover, the absorbed magnesium chloride is highly objectionable since it remains in the product as magnesium chloride. It is highly corrosive, and being hygroscopic, absorbs water and eventually weakens the cement. Similarly, it has always been necessary heretofore to use an excess (over the optimum proportions) of magnesium sulphate solution, in magnesium oxysulphate cements. While magnesium sulphate is not so hygroscopic as magnesium chloride, free magnesium sulphate in the final product is nevertheless objectionable not only because of increase in weight and cost but because of fluorescence or blooming.

The foregoing objections have been eliminated by the use of a non-absorbent aggregate in the form of a foam made with the slurry comprising the magnesium oxide and magnesium chloride solution. Unlike foams made in which water is the liquid phase, such as in various hydraulic cements, e. g., gypsum and Portland cement, the magnesium oxychloride cement slurry itself constitutes the foam. In the case of hydraulic cements, the water migrates to the cement particles to hydrate them. Many cement particles are too large to be carried in solution in the bubble film. Therefore the cement structure comprises a skeleton of interbonded partly hydrated cement particles around a pore space originally formed by a bubble of water. In the case of magnesium oxychloride cement, the bubble comprises a homogeneous film of magnesium oxide and magnesium chloride which react over the entire area of the film to form a bubble or sphere comprising a relatively continuous and uniform film of magnesium oxychloride cement. Individual particles of magnesium oxide no longer exist; whereas in the case of hydraulic cements or gypsum, the original cement particles remain, having only hydrated sufficiently to interlock with other particles. In the case of hydraulic cements, the resulting structure is thus not a series of contacting and interbonded bubbles comprising a relatively continuous and uniform film of cement, but a series of hydrated cement particles arranged around a more or less spherical pore space. The difference is important in the much greater strength of the continuous and uniform spherical cement films of oxychloride cement for a given weight and quantity of cement.

All the magnesium chloride is available and used in reaction with the magnesium oxide, and it is therefore possible to use the optimum proportions of magnesium oxide and magnesium chloride. None of the magnesium chloride remains uncombined in the product to absorb water, form an unsightly bloom and weaken the cement. In this connection it should be understood that the strength of magnesium oxychloride cement depends not only on the ratio of magnesium oxide to magnesium chloride, but on the concentration of the magnesium chloride solution. It is difficult to obtain a satisfactory reaction if the concentration be substantially less than 18° Bé.

The strength and weight per cubic foot of the product vary both with the volume of foam and the size of the foam bubbles. The latter depend somewhat on the specific foaming agent used, as presently explained. Some agents form a very fine-textured foam. Others, coarse-textured foams, i. e., comprising relatively larger foam bubbles. Still others produce foams intermediate very fine and coarse. Fine-textured foams produce products of greater strength than those with coarse-textured foams, using the same amount of cement. The latter, on the other hand, are more fluid or plastic than the fine-textured foams.

As regards weight or density of the final product, this depends on the amount of air incorporated in the foam; and this, in turn, depends on the duration of the mixing or beating action. Some foaming agents require a longer time than others to develop a foam of a specific volume, but with a given foaming agent the volume depends on duration of the beating action. Only a very small amount of foaming agent is required, and this is adequate to form a foam of any practicable volume. Of course there is a limit to the volume which can be produced with a given amount of cement slurry, but generally the maximum volume is impractical because the resulting product would be too weak.

The foaming of the cement is preferably effected mechanically by an appropriate rotary mixer or beater. This results in a uniform textured foam and is more susceptible to control than air or other means of agitation. Beating is discontinued when the desired foam volume is reached. As soon as foam starts to develop there is a great increase in plasticity of the cement, and this facilitates development of the foam and subsequent molding and forming of the product.

Foaming agents which are insensitive to an electrolyte such as magnesium chloride solution, should be used. These generally fall in the category of non-ionic foaming agents, one example of which is hydrolized soy bean protein such as that sold by National Foam Systems under the trade-mark Fomon P B-2. About 2% of such foaming agent on the magnesium chloride solution will, on mechanical agitation as in a beater, produce a very fine-textured foam which may be used as an aggregate and mixed with magnesium oxide with very little loss of volume.

Other foaming agents are licorice extract, such as that used in making fire extinguishing foams, resinous wood extracts, etc. Still another is a hydrolized or enzyme degraded vegetable protein put on the market by American-LaFrance-Foamite Corporation under the trade name "Airfoam." About ½ of 1% of the "Airfoam" foaming agent on the chloride solution will produce a very satisfactory stable foam whose texture is not quite so fine as that produced by the hydrolized soy bean protein. However, strength is not quite so great as with the finer textured foam.

Where a still larger pore structure is desired, non-ionic wetting agents may be used as foaming agents. These produce a weaker foam which has advantages in accoustical material, where it is desired to have a large number of communicating pores for absorption of sound. With a weaker bubble film many more of the bubbles will be communicating when the cement finally sets, than where a tough, fine-textured foam is used. However, for acoustical material too large pores are not desirable, because too much sound reflection is permitted. The intermediate sized foam texture produced by the aforesaid "Airfoam" is quite satisfactory for accoustical material. In making such material the surface of the formed or molded product is either cut, abraded, or otherwise treated to break the surface cement film and thereby to produce open surfaces pores which communicate with the interior pores if, as explained above, the bubble foam is weak enough to break partly on setting of the cement.

Examples of non-ionic wetting agents for producing the coarser-textured foam are: A non-ionic alkyl aryl polyether alcohol, such as that placed on the market by Rohm & Haas under the trade name "Triton NE." Another is a non-ionic polyglycol ether, such as that placed on the market by General Analine & Film Corporation (Antara Products Division) under the trade name "Antarax A-280." Many other non-ionic wetting agents on the market are suitable but most of these are identifiable only by trade names. They will produce foams of varying degrees of strength and stability.

Only a small amount (from a fraction of one per cent to a few per cent) of the volume of magnesium chloride solution is required to produce the desired strength and volume of foam on mechanical mixing. Other forms of mixing than mechanical mixing may be employed, but generally mechanical mixing produces the most uniform textured foam. The amount of foaming agent employed varies both with the foaming agent itself and the desired character of the foam. The volume of the foamed cement increases (until the maximum volume is reached) with the degree of mixing or agitation.

In conventional magnesium oxychloride cement, the most generally satisfactory concentration of magnesium chloride solution has been 22° Bé., but I have found that this has been partly determined by the circumstance that a more concentrated solution (involving less water) would result in too stiff a mixture to work readily, bearing in mind the limiting ratio of approximately one part of magnesium oxide to .8 parts of magnesium chloride flakes. I have found that with foam as an aggregate, a more concentrated solution, up to about 32° Bé., may be used (with resulting higher strengths) because the foam increases the plasticity or workability of the mixture even though less water has been used in the solution. Thus, it is possible, without producing too stiff a mixture, to use whatever magnesium chloride concentration will produce the best results without regard to other considerations.

For some types of product, it is desirable to use a small amount of strong fiber in the mixture as reinforcement. The amount used is too small to result in any appreciable absorption of magnesium chloride by the fiber. For example, a small amount of glass fiber, e. g., 2.5%, will reinforce the product against breaking in handling and application. Glass fiber is exceptionally strong. Also, where improved nailing characteristics are desired, a small amount of bagasse fiber may be used. This makes the product softer and less likely to crack when nails are driven through it, and particularly when they are driven close to the edge of the product. The amount of bagasse used is too small to be regarded as an aggregate, and it absorbs little magnesium chloride solution.

The following are illustrative products embodying the invention:

One light-weight product having non-communicating pores comprises

| | |
|---|---|
| Magnesium oxide | 500 grams. |
| Magnesium chloride solution (22° Bé.) | 1000 cc. |
| Glass fiber | 5% on the weight of magnesium oxide |
| Foaming agent (PB-2) | 2% on the volume of magnesium chloride solution |

The above ingredients are mechanically whipped to such volume that the final dry product weighs 23 pounds per cubic foot. The product has a compression strength of 453 pounds per square inch, and a modulus of rupture of 168 pounds.

A somewhat lighter product may be formed with the above cement (except that only 4% of glass fiber is used) by whipping the cement to such volume that the dry product will weigh 19 pounds per cubic foot. Such product is of course weaker than that first described. By limiting the beating so as to produce a smaller volume of foamed cement which, when dry, weighs 29 pounds per cubic foot, the modulus of rupture will be increased to 220 pounds.

A product weighing as little as 12 pounds per cubic foot can be obtained with the same cement by more prolonged whipping, but it is correspondingly weaker.

The time required for producing the desired volume varies with the particular foaming agent used and also with the presence or absence of even a small amount of fiber or other solid in the cement. The same cement without fiber may be foamed to a volume necessary to produce a material weighing 23 pounds per cubic foot, in 4½ minutes, whereas with the fiber in the cement, the foaming time is increased to 10 minutes.

Obviously the invention is not limited to the details of the illustrative products or their method of manufacture since these may be variously modified. Moreover, it is not indispensable that all features of the invention be used conjointly, since various features may be used to advantage in different combinations and subcombinations.

Having described my invention, I claim:

1. The method of making a magnesia cement product comprising magnesium oxide and a magnesium salt selected from the group consisting of magnesium chloride and magnesium sulphate and containing no free or uncombined amounts of said salt, which method comprises making a slurry of magnesium oxide and a solution of one of said salts and having such ratio of oxide to salt as to leave no free salt in the product and containing substantially no solid aggregate, incorporating therein about 2% or less of a foam forming agent selected from the group consisting of hydrolized protein and non-ionic wetting agents, agitating the slurry to entrain air therein to provide a moldable cement comprising a voluminous foam wherein the walls of the foam bubbles comprise a uniform film of said cement, said air bubbles absorbing substantially no salt solution thereby rendering all of the said solution available for reaction with the magnesium oxide, the said salt solution being of greater concentration than would be possible if the cement embodied solid aggregate equivalent in volume to that of the air bubbles in said cement, and then molding the cement containing the air bubbles.

2. The method of making a magnesia cement product comprising magnesium oxide and a magnesium salt selected from the group consisting of magnesium chloride and magnesium sulphate, and containing no free or uncombined amounts of said salt, which method comprises making a slurry of magnesium oxide and a solution of one of said salts and having such ratio of oxide to salt as to leave no free salt in the product, incorporating therein about 2% of a non-ionic foaming agent, agitating the slurry to entrain air therein to provide a cement of flowable consistency comprising voluminous foam wherein the walls of the foam bubbles comprise a uniform film of said cement, the concentration of said solution being independent of the working consistency of the cement, said air bubbles absorbing substantially no salt solution thereby rendering all of the salt in said solution available for reaction with the magnesium oxide, the said salt solution being of greater concentration than would be possible if the cement embodied solid aggregate equivalent in volume to that of the air bubbles in said cement, and then molding the cement containing the air bubbles.

3. A cementitious material for use in molding sound absorbing material comprising magnesium oxide and a salt solution selected from the group consisting of magnesium chloride solution and magnesium sulphate solution, the ratio of salt in said solution to oxide being not substantially less than about eight-tenths to one, said cementitious material containing substantially no solid aggregate, and containing a small amount of a foam forming agent insensitive to electrolytes and selected from the group consisting of hydrolized protein and non-ionic wetting agents, and air cells to sub-divide the cementitious material into very thin homogeneous films of substantially neat cement surrounding said cells, said air cells being substantially non-absorbent of said salt solution thereby rendering all said solution available for reaction with said magnesium oxide with no free salt remaining, the concentration of the salt solution being greater than would be possible if the cementitious material contained solid aggregate equivalent in volume to that of the air cells in said cementitious material.

4. A cementitious material for use in molding sound absorbing material comprising magnesium oxide and a salt solution selected from the group consisting of magnesium chloride solution and magnesium sulphate solution, the ratio of salt in said solution to oxide being not substantially less than about eight-tenths to one, said cementitious material containing substantially no solid aggregate and containing a small amount of a foam forming agent selected from the group consisting of hydrolized protein and non-ionic wetting agents, and air cells to sub-divide the cementitious material into very thin films of homogeneous and substantially neat cement surrounding said cells, said air cells being substantially non-absorbent of said salt solution thereby rendering all said solution available for reaction with said magnesium oxide with no free salt remaining, the concentration of the salt solution being independent of the working consistency of the cement and being greater than would be possible if the cementitious material contained solid aggregate equivalent in volume to that of the air cells in said cementitious material.

5. A magnesia cement product formed of neat magnesia cement containing substantially no solid aggregate selected from the group consisting of magnesium oxychloride and magnesium oxysulphate cements and containing communicating air cells as substantially the sole aggregate, said product having therein a small amount of a foam forming agent selected from the group consisting of non-ionic and hydrolized protein foam forming agents, said agent being adapted to occlude air cells in the product on agitation thereof, the said agent forming somewhat unstable foam so that the air cells will partly break into communicating cells, the air cells containing substantially no absorbed or free salt, the salt being completely reacted with said magnesium oxide, the walls of said air cells comprising films of said cement in neat and homogeneous form and being too thin to develop fracturing internal stresses.

6. A magnesia cement product formed of neat magnesia cement containing substantially no solid aggregate and selected from the group consisting of magnesium oxychloride and magnesium oxysulphate cements, said cements being formed by the reaction between magnesium oxide and a magnesium salt solution selected from the group consisting of magnesium chloride and magnesium sulphate, said cement containing substantially the theoretically correct chemical ratio of magnesium oxide to said salt, said product containing air cells as substantially the sole aggregate, said product having therein a small amount of a foam forming agent selected from the group consisting of non-ionic and hydrolized protein foam forming agents, said agent being adapted to occlude air cells in the product on agitation thereof, the air cells containing substantially no absorbed or free salt, the said salt being completely reacted with said magnesium oxide, the walls of said air cells comprising films of said cement in neat and homogeneous form and being too thin to develop fracturing internal stresses.

PAUL S. DENNING.

REFERENCES CITED

The following references are of record in the file of this patent:

UNITED STATES PATENTS

| Number | Name | Date |
|---|---|---|
| 2,167,606 | Cavadino | July 25, 1939 |
| 2,215,812 | Kaplan | Sept. 24, 1940 |

FOREIGN PATENTS

| Number | Country | Date |
|---|---|---|
| 525,638 | Great Britain | 1940 |